(12) United States Patent
Chen

(10) Patent No.: US 9,228,731 B2
(45) Date of Patent: Jan. 5, 2016

(54) BULB WITH SENSING FUNCTION AND CAMERA

(76) Inventor: Kaipo Chen, Taoyuan Hsien (TW)

( * ) Notice: Subject to any disclaimer, the term of this patent is extended or adjusted under 35 U.S.C. 154(b) by 249 days.

(21) Appl. No.: 13/220,720

(22) Filed: Aug. 30, 2011

(65) Prior Publication Data

US 2013/0050495 A1  Feb. 28, 2013

(51) Int. Cl.
*F21V 23/04* (2006.01)
*G08B 13/196* (2006.01)
*H04N 7/18* (2006.01)

(52) U.S. Cl.
CPC ......... *F21V 23/0478* (2013.01); *F21V 23/0464* (2013.01); *F21V 23/0471* (2013.01); *G08B 13/19617* (2013.01); *G08B 13/19619* (2013.01); *G08B 13/19695* (2013.01); *H04N 7/183* (2013.01); *G08B 13/19634* (2013.01)

(58) Field of Classification Search
CPC ... F21V 3/02; F21V 23/0478; F21V 33/0052; G08B 13/19619; G08B 13/19617; G08B 13/19634
USPC .......................................................... 348/151
See application file for complete search history.

(56) References Cited

U.S. PATENT DOCUMENTS

| | | | |
|---|---|---|---|
| 2,464,067 A * | 3/1949 | Barker | 396/433 |
| 4,812,827 A * | 3/1989 | Scripps | 340/693.1 |
| 4,896,145 A * | 1/1990 | Lewkowicz | 340/693.1 |
| 5,305,033 A * | 4/1994 | Takahashi et al. | 396/429 |
| 5,886,738 A * | 3/1999 | Hollenbeck et al. | 348/151 |
| 6,057,778 A * | 5/2000 | Davidson | 340/693.5 |
| 6,259,476 B1 * | 7/2001 | Greene | 348/151 |
| 6,462,775 B1 * | 10/2002 | Loyd et al. | 348/151 |
| 6,624,845 B2 * | 9/2003 | Loyd et al. | 348/151 |
| 6,812,970 B1 * | 11/2004 | McBride | 348/372 |
| 6,820,998 B2 * | 11/2004 | Chen | 362/276 |
| 7,327,254 B2 * | 2/2008 | Chen | 340/545.2 |
| 7,467,881 B2 * | 12/2008 | McMillen | 362/364 |
| 7,527,440 B1 * | 5/2009 | White | 396/419 |
| 8,066,392 B2 * | 11/2011 | Wang | 362/20 |
| D654,603 S * | 2/2012 | Chen | D26/2 |
| 8,393,757 B2 * | 3/2013 | Uemoto et al. | 362/249.03 |
| 8,456,568 B2 * | 6/2013 | Wendt | 348/370 |
| 8,599,254 B2 * | 12/2013 | Zittel | 348/143 |
| 8,731,392 B2 * | 5/2014 | Sorg et al. | 396/200 |

(Continued)

FOREIGN PATENT DOCUMENTS

| | | | | |
|---|---|---|---|---|
| CH | EP 1489571 A1 * | 12/2004 | | F21V 33/0052 |
| DE | 102004035027 A1 * | 2/2006 | | G08B 17/10 |

(Continued)

*Primary Examiner* — Dave Czekaj
*Assistant Examiner* — David N Werner
(74) *Attorney, Agent, or Firm* — Leong C. Lei

(57) ABSTRACT

A bulb comprises a lower case, a circuit board, an upper case, a sleeve, a sensor cap, and a camera. The lower case is provided with an electrical contact portion at a bottom thereof. The circuit board is mounted within the lower case and provided with a plurality of light emitting elements and an infrared sensor. The upper case is mounted on an upper edge of the lower case and defines an opening at a center thereof. The sleeve is mounted to the lower case and fitted with the opening of the upper case. The sensor cap is mounted on top of the sleeve. The camera is located adjacent to the infrared sensor. Thereby, when an infrared source enters the sensing scope of the infrared sensor, the camera can be triggered to take images and the light emitting elements can be turned on to perform illumination.

6 Claims, 5 Drawing Sheets

(56) References Cited

U.S. PATENT DOCUMENTS

| | | | |
|---|---|---|---|
| 8,820,961 B2* | 9/2014 | Kim | 362/234 |
| 2002/0154218 A1* | 10/2002 | Loyd | F21V 33/0052 |
| | | | 348/151 |
| 2003/0197807 A1* | 10/2003 | Wu | G03B 13/19619 |
| | | | 348/375 |
| 2004/0201989 A1* | 10/2004 | Raskas | 362/253 |
| 2006/0028811 A1* | 2/2006 | Ross et al. | 362/157 |
| 2006/0044789 A1* | 3/2006 | Curtis | 362/152 |
| 2007/0098391 A1* | 5/2007 | Howard et al. | 396/155 |
| 2008/0246844 A1* | 10/2008 | Chan | 348/152 |
| 2009/0141459 A1* | 6/2009 | Weber | 361/728 |
| 2009/0185376 A1* | 7/2009 | Yu | 362/253 |
| 2009/0310342 A1* | 12/2009 | Chang | 362/205 |
| 2010/0148672 A1* | 6/2010 | Hopper | 315/113 |
| 2010/0277082 A1* | 11/2010 | Reed et al. | 315/159 |
| 2011/0309735 A1* | 12/2011 | Parker et al. | 313/46 |

FOREIGN PATENT DOCUMENTS

| | | | | |
|---|---|---|---|---|
| EP | 2570723 A1 * | 3/2013 | | F21V 23/04 |
| EP | 2665048 A1 * | 5/2013 | | G08B 15/00 |
| FR | 2740245 A1 * | 4/1997 | | G08B 13/196 |
| GB | 2449300 A * | 11/2008 | | F21S 8/00 |
| WO | WO 9715907 A1 * | 5/1997 | | G08B 15/001 |
| WO | WO 0022588 A1 * | 4/2000 | | F21V 33/0052 |
| WO | WO 2004095386 A1 * | 11/2004 | | G08B 13/19619 |
| WO | WO 2011049435 A1 * | 4/2011 | | F21V 7/09 |
| WO | WO 2011117691 A1 * | 9/2011 | | G03B 21/26 |

* cited by examiner

BULB WITH SENSING FUNCTION AND CAMERA

(A) TECHNICAL FIELD OF THE INVENTION

The present invention relates a bulb with a sensing function and a camera, and more particularly to a bulb that contains a camera mounted adjacent to an infrared sensor thereof to allow the bulb to conduct the function of surveillance more effectively.

(B) DESCRIPTION OF THE PRIOR ART

Conventionally, security monitoring equipments are designed in the manner that an infrared sensor is installed separately from an camera. The conventional equipments are conspicuous in appearance and have a larger volume. Thus, it is easy for intruders to avoid the surveillance of the conventional equipments.

Currently, security monitoring equipments are manufactured in smaller volume to render them less noticeable. However, the design of the security monitoring equipments also leaves a way to avoid the attention and the monitoring scope of the equipments, thereby causing a failure in recording activities. There is still a room for further improvement.

In view of the foregoing, the applicant has contrived an improved bulb with a sensing function and a camera after disclosing the U.S. Pat. No. 7,327,254 to soften the drawback of the conventional equipments and meet the needs of users.

SUMMARY OF THE INVENTION

The primary object of the present invention is to provide a bulb with a sensing function and a camera, which can perform surveillance more effectively.

The bulb comprises a lower case, a circuit board, an upper case, a sleeve, a sensor cap, and a camera. The lower case is provided with an electrical contact portion at a bottom thereof. The circuit board is mounted within the lower case and provided with a plurality of light emitting elements and an infrared sensor. The upper case is mounted on an upper edge of the lower case and defines an opening at a center thereof. The sleeve is mounted to the lower case and fitted with the opening of the upper case. The sensor cap is mounted on the sleeve for covering the infrared sensor. The camera is mounted between the upper case and the lower case and located adjacent to the infrared sensor. Thereby, when an infrared source enters the sensing scope of the infrared sensor, the camera can be triggered to take images and the light emitting elements can be turned on to perform illumination.

Other objects, advantages, and novel features of the present invention will become more apparent from the following detailed description when taken in conjunction with the accompanying drawings.

DETAILED DESCRIPTION OF THE PREFERRED EMBODIMENTS

Figure 1:
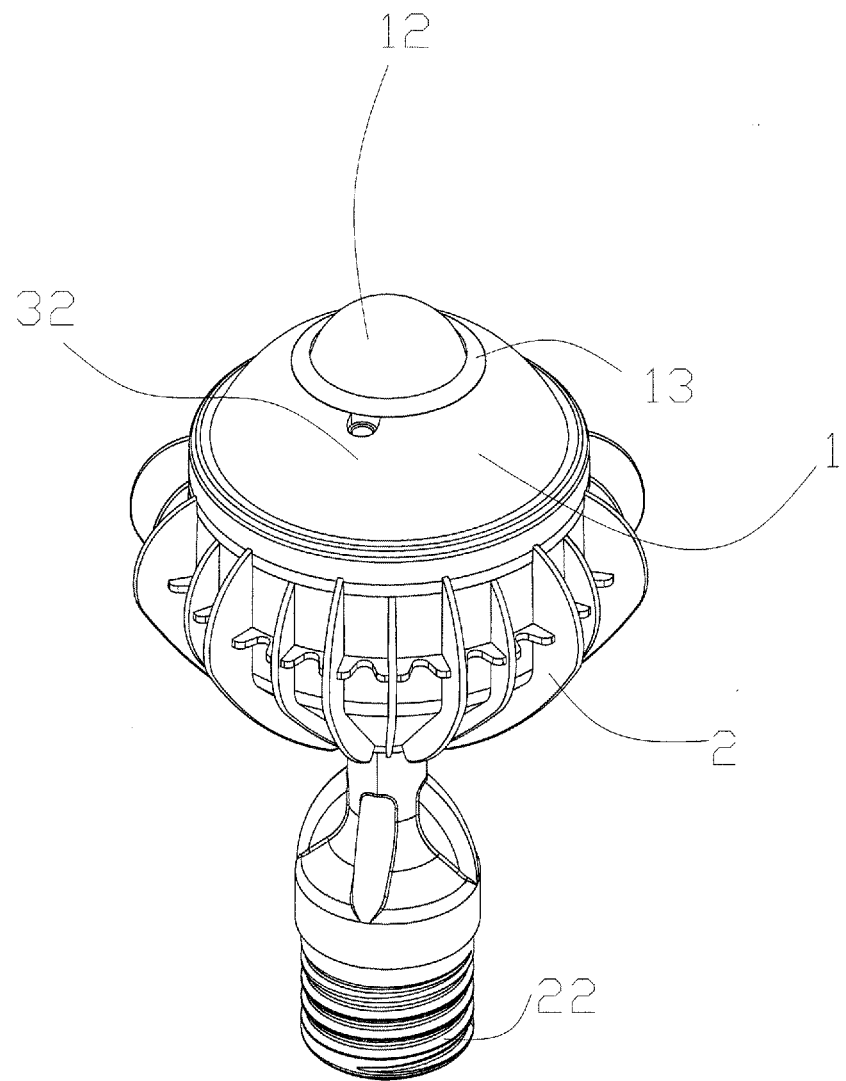
FIG. 1 is a 3-dimensional view of the present invention.
Figure 2:
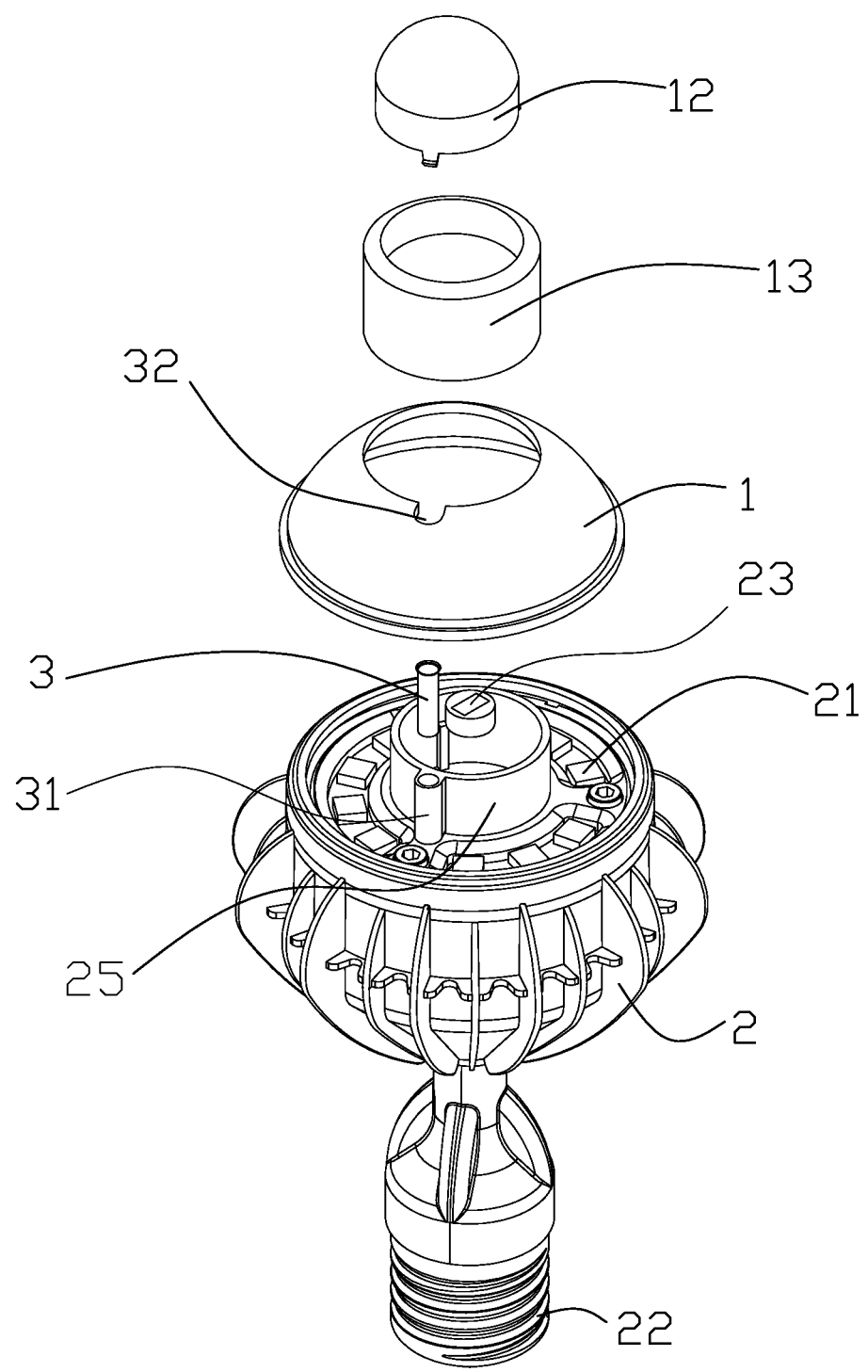
FIG. 2 is an exploded view of the present invention.
Figure 3:
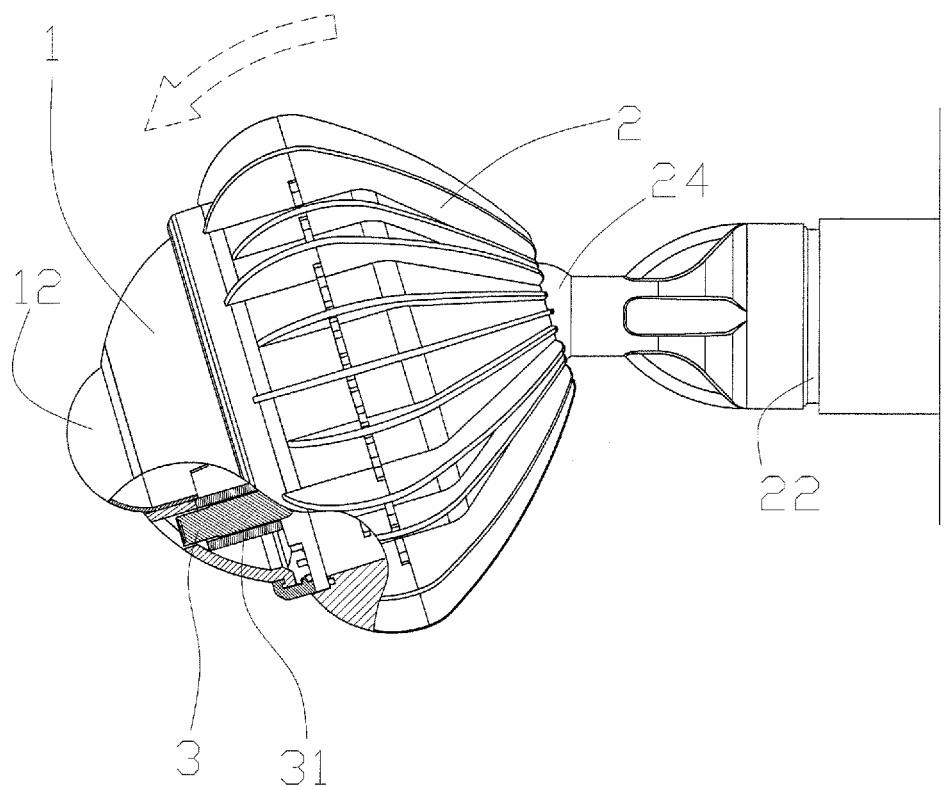
FIG. 3 is a schematic view of the present invention.
Figure 4:
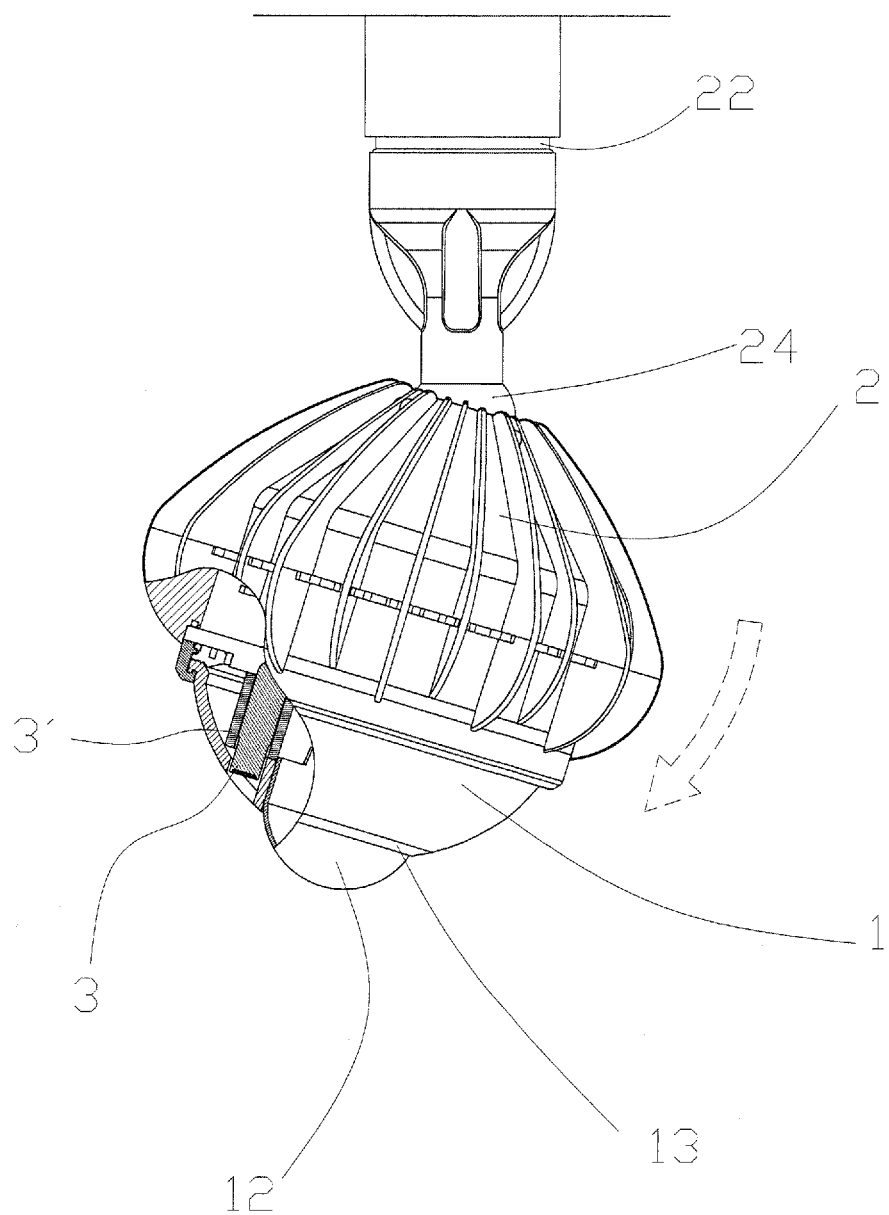
FIG. 4 is another schematic view of the present invention.
Figure 5:
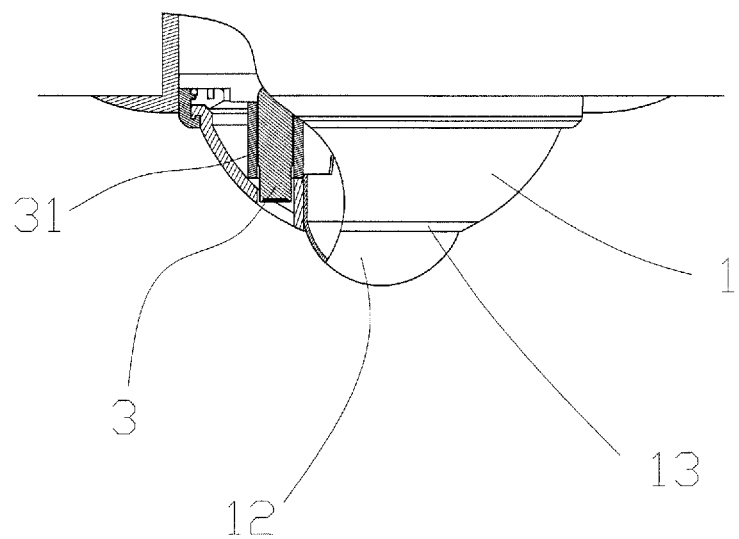
FIG. 5 is a partially schematic view of the present invention.

Turning now to FIGS. 1-4, a preferred embodiment of a bulb according to the present invention generally comprises an upper case 1, a lower case 2, and a camera 3. Preferably, the camera 3 is a type of miniature camera, so that it is not easy to be noticed by intruders.

As shown, the lower case 2 is provided with an electrical contact portion 22 at a bottom thereof to be threadedly connected to a lamp socket, which can afford the bulb AC electrical power. A ball fitting 24 may be provided between the electrical contact portion 22 and the lower case 2, so that the bulb can be orientated at a desired direction through adjustment of the ball fitting 24. A circuit board is mounted within the lower case 2. The upper case 1 is threadedly connected to an upper edge of the lower case 2 and defines an opening at a center thereof. The sleeve 13 is mounted to the lower case 2 and fitted with the opening of the upper case 1. Particularly, the sleeve 13 can be mounted to the lower case 2 around a central tube of the lower case 2 and fitted with the opening of the upper case 1 at a top thereof. The circuit board is provided with a plurality of light emitting elements 21 and an infrared sensor 23, wherein the light emitting elements 21 are arranged along a periphery of the circuit board, and the infrared sensor 23 extends out of the central tube 25 of the lower case 2. The lower case 2 defines a slot 31 adjacent to the infrared sensor 23. The upper case 1 defines a hole 32 corresponding to the slot 31 of the lower case 2, whereby the camera 3 can be inserted into the slot 31 of the lower case 2 and fitted with the hole 32 of the upper case 1, so that the camera 3 is located adjacent to the infrared sensor 23. The camera 3 is electrically connected with the circuit board within the lower case 2 and can take images through the hole 32 of the upper case 1. Although the camera 3, the light emitting elements 21, and the infrared sensor 23 are mounted on the same circuit board, they can be each mounted on an individual circuit board to conduct its respective functions. Finally, the sensor cap 12 is mounted on top of the sleeve 13 through a latch means for covering the infrared sensor 23, so that the sensor cap 12 can prevent the intrusion of dusts and insects while allowing the infrared radiation to penetrate.

In use, the bulb of the present invention can be installed at a site, such as a door, a passageway, eaves, a garage, and so on. The bulb of present invention can be threaded into a bulb socket for connecting with an alternating current source, which can be converted into suitable sources for the electronic components of the bulb. When an infrared source (such as a human body) enters the sensing scope of the infrared sensor 23, the camera 3 can be triggered to take images and the light emitting elements 21 can be turned on to perform illumination. When the infrared sensor 23 does not detect an infrared source, the camera 3 will stay at a standby state. When the infrared sensor 23 detects an infrared source again, the camera 3 may be triggered again to take images and the light emitting elements 21 may be turned on again to perform illuminate. Furthermore, the camera 3 can be connected to a computer to allow a remote control and monitoring of the site where the bulb is installed, so as to perform surveillance more effectively in addition to the occult feature of the bulb.

Although the present invention has been described with a certain degree of particularity, it is understood that the present disclosure is made by way of example only and the combination and arrangement of parts may be resorted to without departing from the spirit and scope of the invention hereinafter claimed.

I claim:
1. A bulb with sensing function, comprising:
a lower case having a first end provided with an electrical contact for input of electricity, and a second end provided with a circuit board on which one or more light emitting element and an infrared sensor for sensing infrared source are mounted, a camera electrically connected with said circuit board within said lower case and adjacent to one side of said infrared sensor; and an upper case engaged with said lower case, said upper case being provided with a first hole for receiving a sleeve on which is mounted a sensor cap for covering said infrared sensor while allowing infrared radiation to penetrate, and a second hole formed adjacent to a circumference of the first hole;

wherein said lower case comprises a circumferential wall formed therein and corresponding to and supporting said sleeve thereon to define collectively a continuous central interior space therein for receiving said infrared sensor, a slot being defined in the circumferential wall and separated from and adjacent to said infrared sensor so as to define a peripheral position with respect to said infrared sensor received in said continuous interior space of said circumferential wall and said sleeve, said second hole of the upper case corresponding to said slot of said lower case; wherein said camera is inserted into said slot of said lower case and fitted with said second hole of said upper case so as to be set at said peripheral position with respect to said infrared sensor; wherein said light emitting elements and said camera are normally de-activated and when an infrared source enters into a sensing scope of said infrared sensor, said camera is activated to take images and said light emitting elements are activated in connection with the camera to perform illumination for photographing.

2. The bulb with sensing function as claimed in claim 1, wherein said infrared sensor, said camera, and said light emitting elements are each mounted on an individual circuit board.

3. The bulb with sensing function as claimed in claim 1, wherein
the camera is separated from the infrared sensor by the slot when the camera is inserted into the slot of the lower case.

4. The bulb with sensing function as claimed in claim 1, wherein
the upper case includes an opening that includes the first hole for receiving the sleeve and the second hole formed in the circumference of the first hole to be in communication with the first hole.

5. The bulb with sensing function as claimed in claim 1, wherein
a diameter of the second hole on the upper case is smaller than an outer diameter of the first hole.

6. The bulb with sensing function as claimed in claim 1, wherein
the infrared sensor is located at the center of the lower case.

* * * * *